Figure 1:
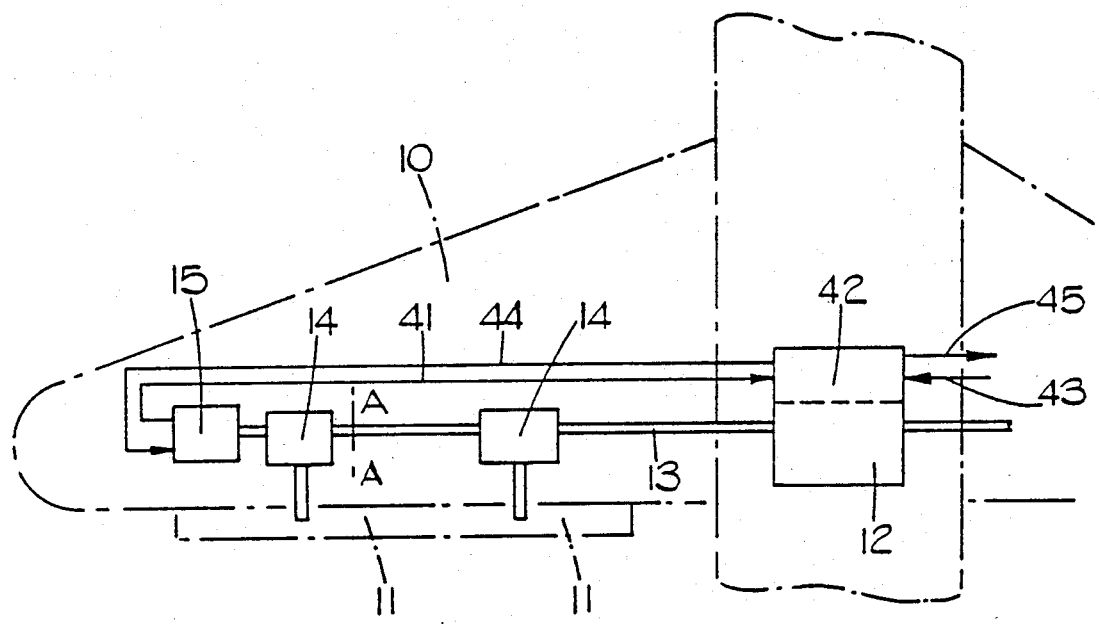

United States Patent [19]

Hudson

[11] Patent Number: 4,633,984
[45] Date of Patent: Jan. 6, 1987

[54] BRAKING ARRANGEMENT FOR A ROTARY DRIVE SYSTEM

[75] Inventor: Philip Hudson, Wolverhampton, England

[73] Assignee: Lucas Industries public limited company, Birmingham, England

[21] Appl. No.: 677,222

[22] Filed: Dec. 3, 1984

[30] Foreign Application Priority Data

Dec. 20, 1983 [GB] United Kingdom ............... 8333848

[51] Int. Cl.⁴ ............................................. B60K 41/24
[52] U.S. Cl. ..................................... 192/9; 192/30 W; 74/572; 74/785; 244/75 R; 188/180
[58] Field of Search ................... 188/171, 180, 134; 74/572, 785; 244/75 R, 213, 76 R; 192/9, 4 R, 30 W

[56] References Cited

U.S. PATENT DOCUMENTS 2,003,552  6/1935  Ranger et al. ................. 188/180
4,260,121  4/1981  Baston et al. ................. 244/213

Primary Examiner—George E. A. Halvosa
Assistant Examiner—Matthew C. Graham
Attorney, Agent, or Firm—Trexler, Bushnell & Wolters, Ltd.

[57] ABSTRACT

The braking arrangement has an input shaft for connection to a drive shaft of the system. A brake device for the input shaft is urged towards operation by a spring released by an electric actuator. The input shaft is coupled to a flywheel by step-up gearing so that the moment of inertia applied by the flywheel to the input shaft is more than 17 times that of the remainder of the arrangement. Acceleration of the drive shaft under an external force is thereby reduced, as is its rotational travel during application of the brake.

5 Claims, 5 Drawing Figures

BRAKING ARRANGEMENT FOR A ROTARY DRIVE SYSTEM

This invention relates to a braking arrangement for arresting a rotary drive to a system, and is principally intended for use in arresting a drive to lift control surface on aircraft wings.

Aircraft wings are provided with a number of movable lift control surfaces which are deployed during landing and take-off to increase wing lift. Any sudden reduction in the amount of lift or substantial asymmetry between the lift provided by the respective wings may have diastrous results. Failure of the drive transmitted to a control surface on either wing will render that control surface liable to be moved by aerodynamic forces to a position of minimum lift. It is therefore desirable that any such failure should result in the control surface being locked as closely as possible to the position which they occupied when failure occurred.

The lift control surfaces are usually operated by geared actuators which are driven by shafts extending along the wings from a suitable motor in the aircraft fuselage. Failure of, a drive shaft, of the motor or of its connection to either drive shaft will allow control surfaces on one or both wings to be moved by aerodynamic forces, as indicated above. It is necessary that in the event of any such failure the drive shafts should be braked, to retain the lift control surfaces in substantially the positions at which failure occurred. U.K. Pat. No. 1591799 discloses a braking apparatus which responds to failure of a drive connection between a motor and the shafts of a lift control system. U.K. Pat. No. 1400449 additionally discloses an arrangement for detecting asymmetry of position between the drive shafts on respective wings of an aircraft, and such an arrangement may be used to apply brakes to both shafts, as taught by U.K. Pat. No. 1591799.

It is a disadvantage of such known arrangements that the time taken between occurrence of failure and application of the brakes is, though short, sufficient to allow the control surfaces to move from their required operating positions by more than an acceptable amount. Typically it is required that in the event of failure the control surfaces shall move by not more than 4°. The foregoing disadvantage arises from the very low moments of inertia of the geared actuator and the drive shaft. Moreover, since each actuator has a high gear ratio, of the order of 500:1, between the drive shaft and the control surface, the inertia of the control surfaces themselves is negligible. Aerodynamic forces will apply relatively high torques to the drive shafts and, in conjunction with the low inertia, will result in very high accelerations of these shafts in the event of failure. These accelerations may typically be 14,000 revolutions/second$^2$. Thus even though brakes may be applied to the drive shaft within, for example 50 ms, this interval will be sufficient for the control surfaces to have moved by more than acceptable amounts, and for the shafts to have reached speeds which are high enough to inhibit effective braking or, if brakes are effectively applied, will result in high forces on parts of the system.

It is an object of the present invention to provide a braking arrangement in which the foregoing disadvantages are reduced or overcome.

According to the invention there is provided a braking arrangement for a rotary drive system which includes a drive shaft and one or more geared actuators connecting said drive shaft to respective driven elements, said braking arrangement comprising an input shaft for connection to said drive shaft, a brake device operable to arrest rotation of said input shaft, a flywheel and step-up gearing drivingly connecting said drive shaft to said flywheel.

In a preferred embodiment the moment of inertia applied by said flywheel to said input shaft is at least 10 times the combined moments of inertia of the remaining parts of said brake arrangement.

Figure 2:
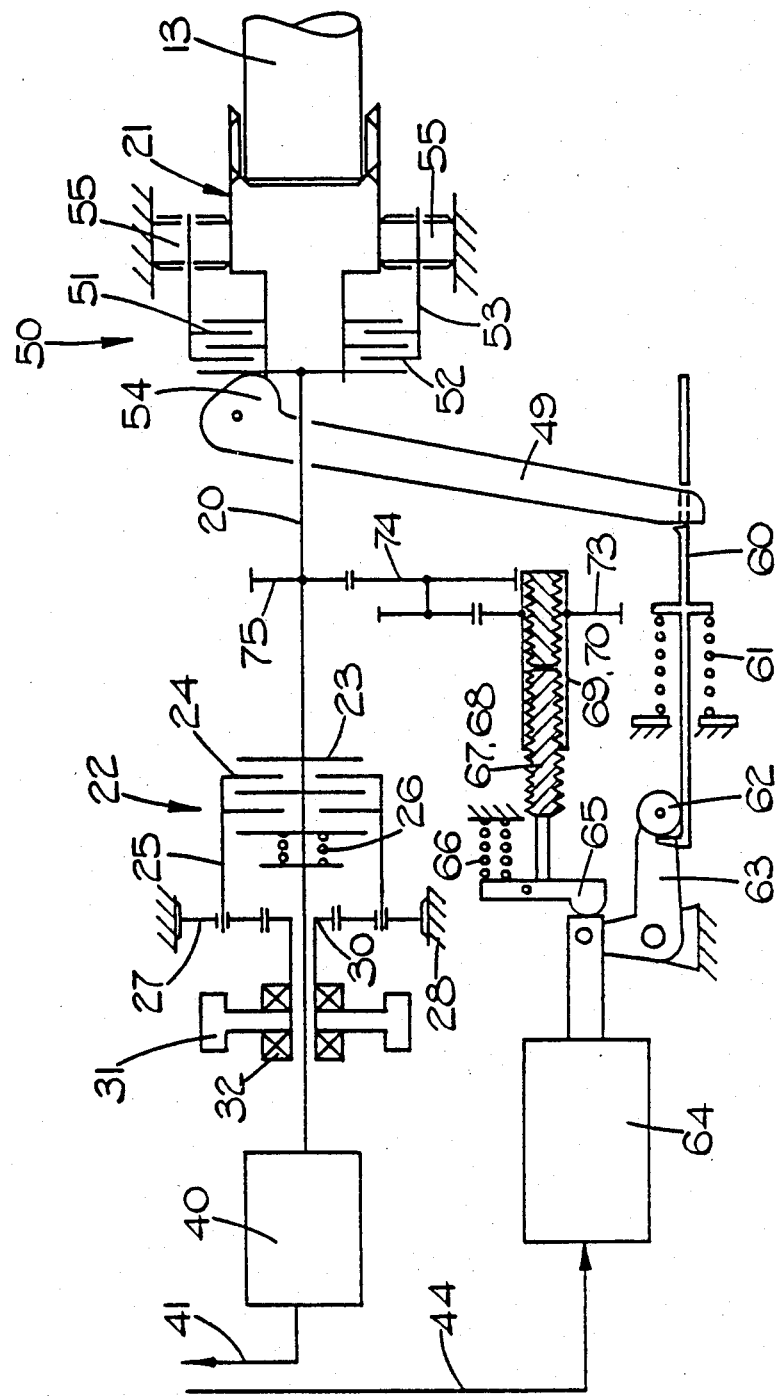
Figure 3:
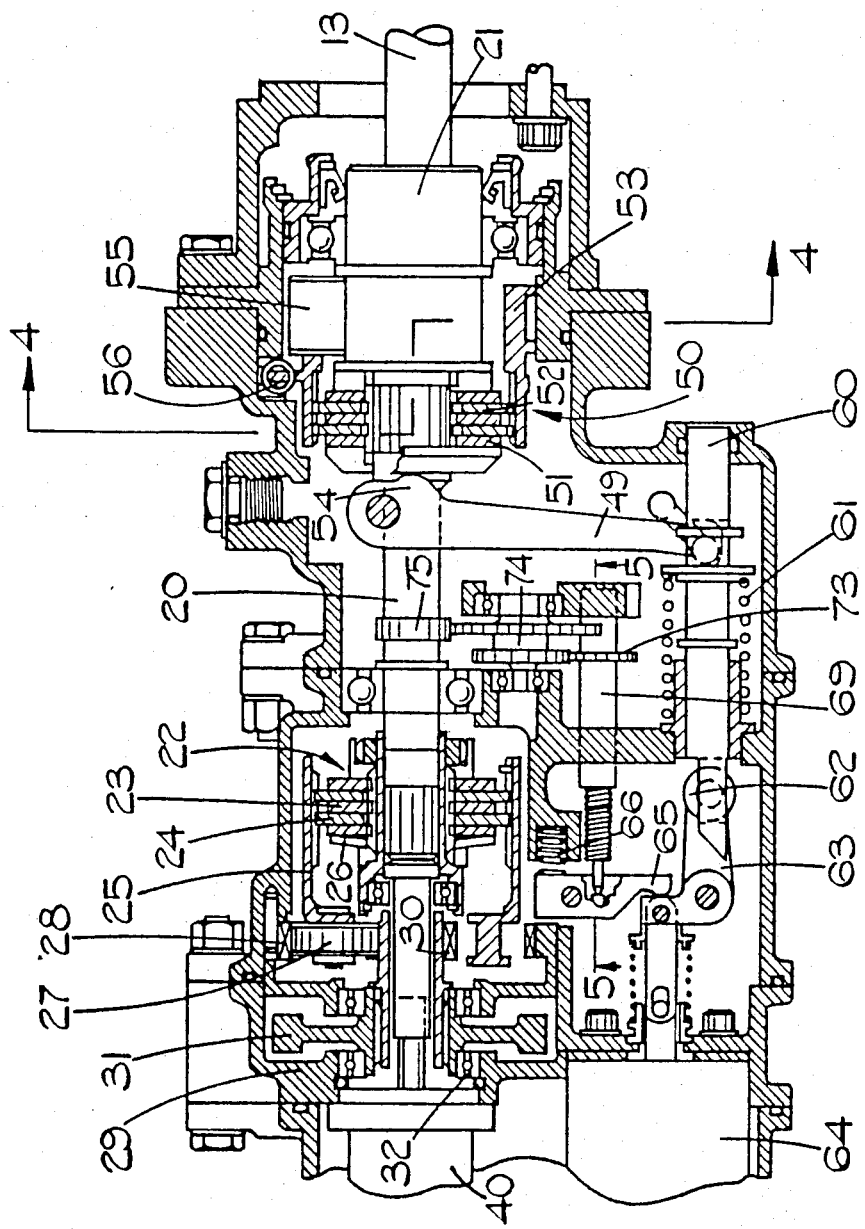
Figure 5:
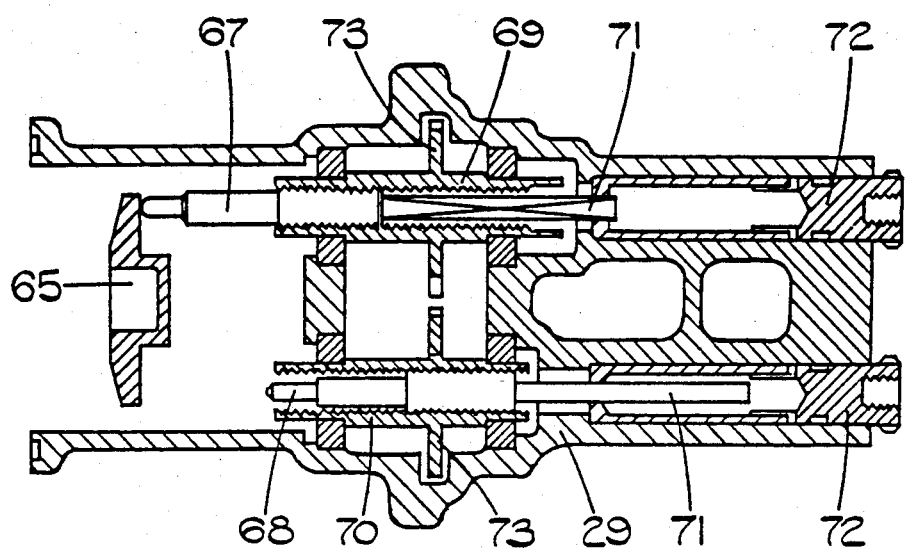
Figure 4:
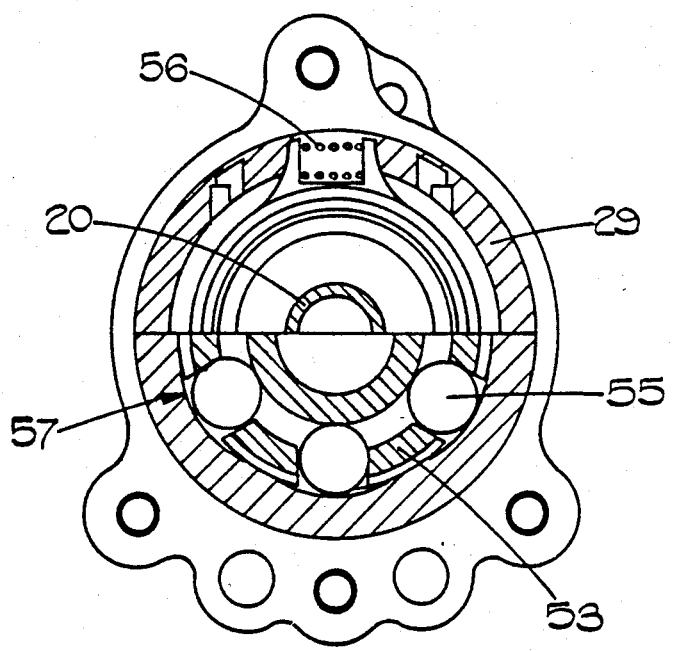

An embodiment of the invention will now be described by way of example and with reference to the accompanying drawings in which:

FIG. 1 is a diagram of a lift control system for an aircraft wing,

FIG. 2 is a diagrammatic representation of a braking arrangement forming part of the system shown in FIG. 1, FIG. 3 is a section in greater detail of the arrangement shown in FIG. 2, and FIGS. 4 and 5 are sections on line 4—4 and 5—5 respectively in FIG. 3.

As shown in FIG. 1 an aircraft wing 10 has a plurality of lift control surfaces 11 mounted thereon. The surfaces 11 are movable between operative and inoperative positions by a motor 12 in the aircraft fuselage, the motor 12 acting through a shaft 13 and actuators 14, each of which incorporates epicyclic reduction gearing having a ratio of 500:1. An actuator of the general type of the actuator 14 is shown in U.S. Pat. No. 3,008,355. A braking arrangement 15 is provided at the outboard end of the shaft 13. It will be understood that a corresponding wing on the other side of the aircraft incorporates an arrangement which is identical with that described above.

The braking arrangement 15 is shown in more detail in FIGS. 2 to 5. These figures should be read in conjunction and corresponding parts therein have been assigned identical reference numerals.

The arrangement 15 has an input shaft 20 with an internally splined portion 21 which engages a complementary spline on the shaft 13. A friction clutch 22 comprises three clutch plates 23 in slidable driving engagement with the shaft 20 and two clutch plates 24 between the plates 23 and in slidable driving engagement with a carrier 25. A spring 26 biases the plates 23, 24 into frictional engagement. Mounted on the carrier 25 is a plurality of planet pinions 27 each of which has 17 teeth and meshes with a 53 toothed ring gear 28 secured to a housing 29 of the arrangement 15. The pinions 27 also mesh with a 19 toothed sun gear 30 which is journalled around the input shaft 20 and which is in splined engagement with a flywheel 31 which is supported in bearings 32 in the housing 29. The flywheel 31 is of a metal having a density of $5.65 \times 10 - $ kg/m$^3$ and is dimensioned so as to have a polar moment of inertia of $54 \times 10^{-6}$ kg/m$^2$. The ratio of the gear train 27, 28, 30 is 3.79:1, and the moment of inertia of this train is approximately $44 \times 10^{-6}$ kg m$^2$, whereby the total moment of inertia applied by the flywheel 31 to the shaft 13 by way of the gear train 27, 28, 30 is $8.2 \times 10^{-4}$ kgm$^2$. The total moment of inertia of the remaining parts of the arrangement 15 is $0.47 \times 10^{-4}$ kg m$^2$, whereby the effective moment of inertia of the flywheel 31 is more than seventeen times that of the remainder of the arrangement 15. The total moment of inertia applied by the arrangement 15 to the shaft 13 is $8.67 \times 10^{-4}$ kg m$^2$.

The shaft 20 is drivingly connected to a transducer 40 which provides an electrical signal on a line 41 to a control unit 42 (FIG. 1) in the motor 12. The signal on line 41 corresponds to the angular position of the shaft 13 and is compared in the control unit 41 with a corresponding signal on a line 43 from the other wing of the aircraft. In the event that the signals on the lines 41, 43 indicate an unacceptable difference in the angular positions of the respective shafts the control unit 42 provides signals on lines 44, 45 to effect braking of the shafts as hereinafter described.

Adjacent the portion 21 of the input shaft 20 is a further friction clutch 50 which includes three plates 51 drivingly and slidably mounted on the shaft 20 and two plates 52 interposed between the plates 51, the plates 52 being drivingly and slidably mounted on a carrier 53. A lever 49 includes a cam face 54 such that rotation of the lever 49 anti-clockwise, as viewed in the drawings, urges the plates 51, 52 into frictional interengagement. As shown more clearly in FIG. 4 the carrier 53 locates a plurality of rollers 55 between the input shaft 20 and the housing 29. The carrier 53 is biased by a spring 56 (FIG. 4) to a position in which the rollers 55 are aligned with recesses 57 in the housing 29, so that the rollers 55 are free to rotate. Engagement of the clutch 50 urges the carrier 53 away from the position shown in FIG. 4 and the rollers 55 are jammed between the housing 29 and the shaft 20, to arrest movement of the latter.

The lever 49 can be urged anti-clockwise by a plunger 60 which is biased by a spring 61 and which can be restrained against movement by the spring 61 by a roller 62 on a cranked arm 63. When the plunger 60 is engaged by the roller 62 the lever 49 is maintained in a position in which the clutch 50 does not provide driving engagement between the shaft 20 and the carrier 53. The lever 63 is movable by an electro-magnetic actuator 64 to release the plunger 60 and permit the lever 49 to move anti-clockwise. The actuator 64 is responsive to signals on the line 45.

The lever 64 is also movable to release the plunger 60 by a further lever 65 which is biased by a spring 66 away from co-operation with the lever 63, but which can be urged against the spring 66 by threaded stems 67, 68, shown in more detail in FIG. 5. Stems 67, 68 have respective right hand and left hand threads and engage complementary threaded sleeves 69, 70 journalled in the housing 29. The stems 67, 68 include portions 71 of square cross-section which pass through square holes in sleeves 72 which frictionally engage the housing 29 and prevent rotation of the stems 67, 68 the arrangement is such that rotation of the sleeve 69, 70 in one direction causes the stem 67 to be moved into engagement with the lever 65 and the stem 68 to be moved away from such engagement. Rotation of the sleeves 69, 70 in the opposite direction causes the aforesaid movement of the sleeves 67, 68 to be reversed. Moreover, the sleeves 69, 70 stationary the stems 67, 68 may be rotated by means of the sleeves 72 for the purpose of initial setting up or testing.

The sleeves 69, 70 include spur gears 73 which mesh with a compound gear element 74 which in turn meshes with a spur gear 75 on the shaft 20. The gear connection between the shaft 20 and the sleeves 69, 70 is such that the latter rotate at approximately one third of the speed of the shaft 20 and the pitch of the threads on the stems 67, 68 is such that the lever 65 is operated to trip the lever 49 and brake the shaft 20 before the control surfaces 11 (FIG. 1) reach their limiting positions in either direction of operation.

The combined moment of inertia of each of the control surfaces 11 and actuators 14, as applied to the shaft 13, is very low, being typically $0.163 \times 10^{-4}$ kg m$^2$. In a worst case, in which the shaft 13 fails at the zone A—A in FIG. 1, the total moment of inertia of the disconnected parts $8.82 \times 10^{-4}$ kg m$^2$. A typical torque of 5.65 Nm applied by disconnected surface 11 to the unit 15 will result in the shaft 20 accelerating at 1020 revs/sec$^2$. In the typical time of 50 milliseconds between failure and operation of the brake rollers 55 the shaft 20 will have rotated only 1.275 revolutions, so that the disconnected surface will have moved only about one degree from its initial position.

The increased moment of inertia is obtained without undue increase in mass, by virtue of the step up gear in the unit 15. When the brake in the arrangement 15 is applied the energy in the flywheel 31 is dissipated as heat in the friction clutch 22.

I claim:

1. A braking arrangement for a rotary drive system which includes a drive shaft and one or more geared actuators connecting said drive shaft to respective driven elements, said braking arrangement comprising an input shaft, means for connecting said input shaft to said drive shaft, an actuator operable by an input signal, braking means operable by said actuator and connected to said input shaft, and means for limiting angular rotation of said input shaft during operation of said braking means, said means for limiting angular rotation comprising a flywheel and gear means for coupling said input shaft to said flywheel so as to drive the latter at a speed greater than that of said input shaft.

2. A braking arrangement according to claim 1 in which the rotary moment of inertia applied by said flywheel to said input shaft by way of said gear means is at least ten times the combined moments of inertia of the remaining rotary parts of said braking arrangement.

3. A braking arrangement according to claim 2 which includes a spring for biassing said braking means towards its operated state, and a detent device for retaining said braking means against operation, said actuator being operable to release said detent device.

4. A braking arrangement according to claim 3 which includes a further actuator responsive to predetermined amounts of rotational travel of said input shaft in respective opposite directions, for releasing said detent device.

5. A braking arrangement according to claim 1 in which said braking means comprises a plurality of rolling elements engageable with said input shaft and with a relatively fixed part of the arrangement, and a friction clutch operable by said actuator to cause movement of said elements to positions in which they frictionally engage said input shaft and said fixed part.

* * * * *